Aug. 25, 1964 M. J. BERARDI 3,146,195
WATER PURIFICATION AND CONDITIONING SYSTEM FOR LOBSTER TANK
Filed Jan. 10, 1961 3 Sheets-Sheet 1
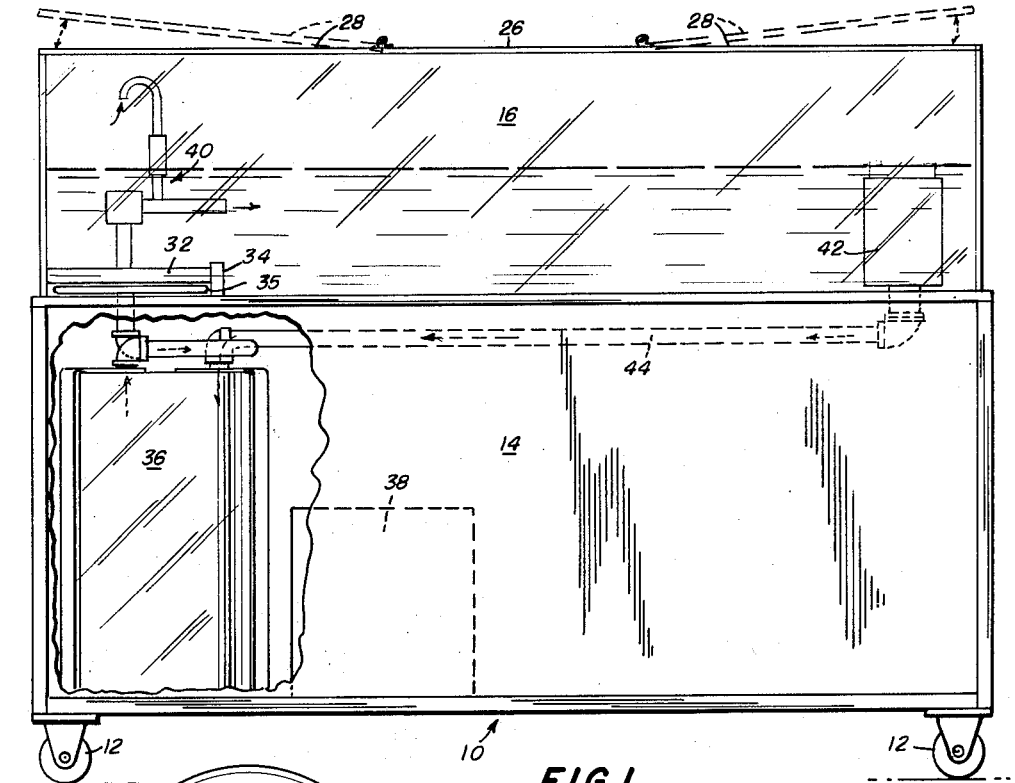
FIG.1
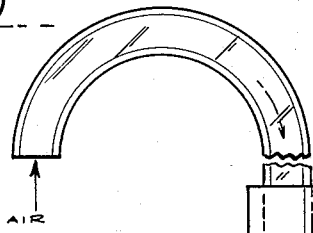
FIG. 6
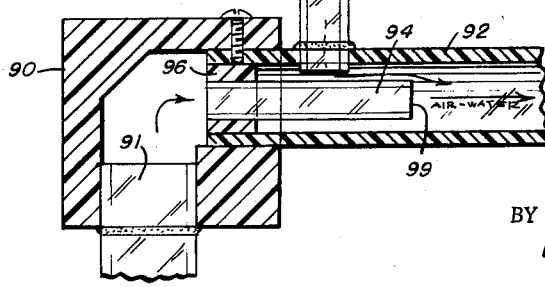
INVENTOR
*MARTIN J. BERARDI*
BY *Fred L. Witherspoon, Jr.*
*Fred. E. Shoemaker*
ATTORNEYS Aug. 25, 1964  M. J. BERARDI  3,146,195
WATER PURIFICATION AND CONDITIONING SYSTEM FOR LOBSTER TANK
Filed Jan. 10, 1961  3 Sheets-Sheet 2

INVENTOR
*MARTIN J. BERARDI*

BY Fred L. Witherspoon, Jr.
Fred E. Shoemaker
ATTORNEYS

Aug. 25, 1964     M. J. BERARDI     3,146,195
WATER PURIFICATION AND CONDITIONING SYSTEM FOR LOBSTER TANK
Filed Jan. 10, 1961     3 Sheets-Sheet 3

INVENTOR
MARTIN J. BERARDI

BY Fred L. Witherspoon, Jr.
Fred. F. Shoemaker
ATTORNEYS

United States Patent Office 3,146,195
Patented Aug. 25, 1964

3,146,195
WATER PURIFICATION AND CONDITIONING SYSTEM FOR LOBSTER TANK
Martin J. Berardi, 53 Fowler Ave., Newburgh, N.Y.
Filed Jan. 10, 1961, Ser. No. 81,814
1 Claim. (Cl. 210—169)

This invention relates to a water purification and conditioning system particularly adapted for us in conjunction with a lobster tank employed to maintain lobsters and the like in live and healthy condition for extended periods of time.

It is well recognized in the industry that it is necessary that means be provided for maintaining lobsters, and the like, in live and healthy condition for a considerable period of time. Many types of lobster storing devices have been placed on the market with varying degrees of success, however, none of them have been eminently successful and it is because of this that there has been developed a water purification and conditioning system that maintains the water in the tank in the proper overall condition to produce a healthy environment for lobsters.

In view of the above it is an object of this invention to provide a lobster tank or the like having a water purification and conditioning system especially suitable for maintaining an environment particularly suitable for lobsters or the like.

It is another object to provide a water purification and conditioning system which is relatively simple in construction and quite reliable in operation.

It is yet another object to provide a water purification and conditioning system employing means for filtering, aerating and maintaining the water at the prescribed temperature.

The above and other objects and advantages will become apparent when taken in conjunction with the following detailed description and drawings, showing by way of example a preferred embodiment of this invention and wherein:

FIGURE 1 is a front elevational view of the tank unit with a portion broken away to show the filter;

FIGURE 6 is a vertical sectional view showing details of the aerating means shown in FIGURES 1 and 2.

Figure 2:
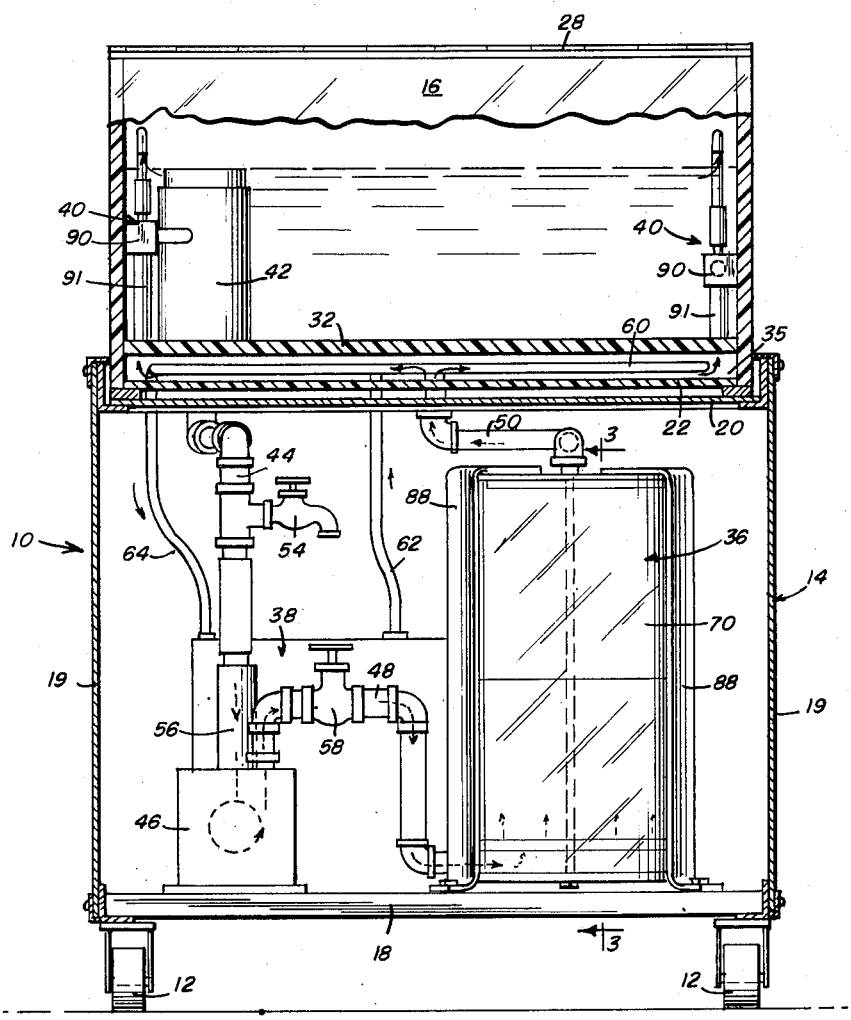
FIGURE 2 is an end elevational view, partly in section, showing details of the water purification and conditioning apparatus.

One preferred embodiment of this invention is shown in the afore described figures of drawings and as illustrated comprises a compartmented assembly 10 in this instance mounted on wheels 12 for purposes of mobility. The compartmented assembly 10 is divided into a lower compartment 14 carrying most of the necessary apparatus and a tank unit 16 carrying the water in which the lobsters reside.

The lower compartment 14 has a bottom 18 with four vertical sides 19 and a somewhat recessed top 20 on which is carried the tank unit 16. This tank unit is generally made of a suitable transparent material such as glass or plastic. It comprises a bottom 22 with four vertical sides and a top made up of a fixed center portion 26 and hinged covers 28—28 on either side thereof. A spaced horizontal plate 32 and a vertical plate 34 combine with appropriate portions of the bottom 22 and one side to form a rectangular receptacle 35 through which the purified water passes on its way into tank 16.

It is necessary to filter, cool and aerate the water in the tank unit 16 in order to maintain the lobsters in a live and healthy condition. This is accomplished by means of a filter assembly 36, a refrigerating unit 38 and aerating means 40.

Referring to FIGURES 1 and 2, the water in tank unit 16 is returned to the purifying and conditioning means through a constant flow return water receiver 42 in tank 16. From the return water receiver the water passes through piping 44 to pump unit 46, thence through piping 48 into the bottom of filter assembly 36, through the filter assembly and piping 50 into cooling area 35 from which it proceeds through aerating assemblies 40 back into the water in the tank 16.

A draw-off valve arrangement 54 is placed in piping line 44 for purposes of drawing off water for balance or test purposes. A filter 56 is placed in line 44 just ahead of pump 46. A flow control valve 58 is placed in line 48 between the pump 46 and the filter assembly 36.

The refrigerating unit 38 may be of conventional design and has its cooling coils 60 placed in the cooling area 35 in the tank 16. Suitable feed line 62 and return line 64 provide passage of refrigerant to and from the coils 60. The refrigerating unit is controlled by conventional controls and consequently they are not illustrated.

Figure 3:
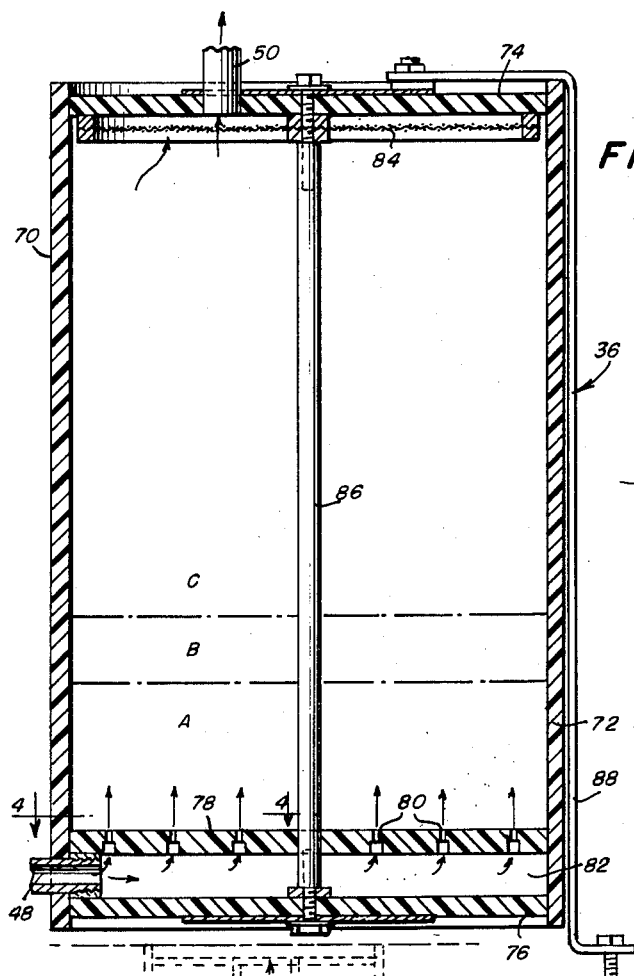
FIGURE 3 is a vertical sectional view of the filter taken along line 3—3 of FIGURE 2.
Figure 4:
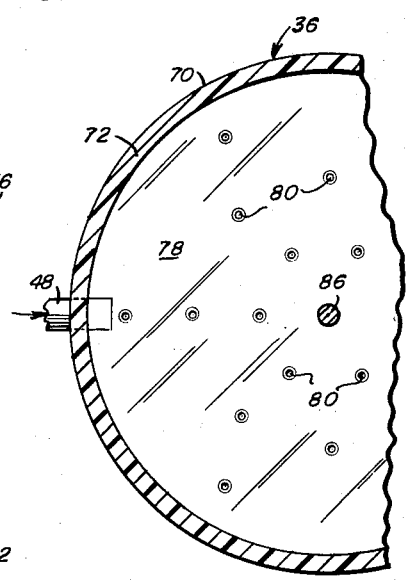
FIGURE 4 is a sectional view taken along line 4—4 of FIGURE 3 showing a plan view of a portion of the perforated filter disk.

As best shown in FIGURES 3 and 4, the filter assembly 36 comprises a cylindrical tank 70 having a vertical wall 72, top 74 and bottom 76. A disk 78 having perforations 80 is mounted in the bottom portion of the filter tank 70 spaced somewhat above the bottom 76 to form a receiving compartment 82 for water being returned from the tank unit 16 for filtration. The filtering materials are held between the perforated disk 78 and screen element 84 positioned at the top of the tank 70. It is the function of the screen to prevent filtering materials from leaving the filter and entering the pipe line 50 which feeds the filtered water to the cooling area 35. The filter assembly 36 is held in assembled position by means of centrally disposed through-rod 86 having suitable washers and nuts thereon to accomplish the desired assembling. The filter assembly is held in position in lower compartment 14 by means of brackets 88 suitably affixed to the bottom 18 of the compartment 14.

The filter element comprises, starting at the bottom, 3" of Culsorb ($MgSO_3$) or any other manganese treated siliceous material designated A in FIGURE 3, then 1" of treated green sand (natural siliceous aluminum iron manganese having the technical name Glaucianitee) designated B, and then 8" of a mixture of equal parts of Celite #544 (calcium carbonate) trade name "Diatonacious" and Aqua Chark or Nuchar which is a straight activated carbon of a phenol value of 20 p.p.m. plus or minus 10% according to American Water Works Specification AWWA B–660–53, designated C.

Referring to FIGURE 6 the aerating or aspirating device comprises a junction block 90 secured to the end of pipe line 91 leading from the cooling chamber 35, said junction block mounts a tube 92 which in turn has a tube 94 centrally positioned therein by means of bushing 96. This bushing forms a water tight seal so that cooled water will pass from the junction block through the small tube 94. An elongated air tube 98 is connected into the tube 92 and extends upwardly therefrom. It should be noted that the air tube is so positioned in tube 92 that its open end within tube 92 is spaced from and rearwardly of the outward open end 99, of tube 94. As shown in FIGURE 1 the air tube is of sufficient length such that its open end will always be above the water level in tank 16.

Figure 5:
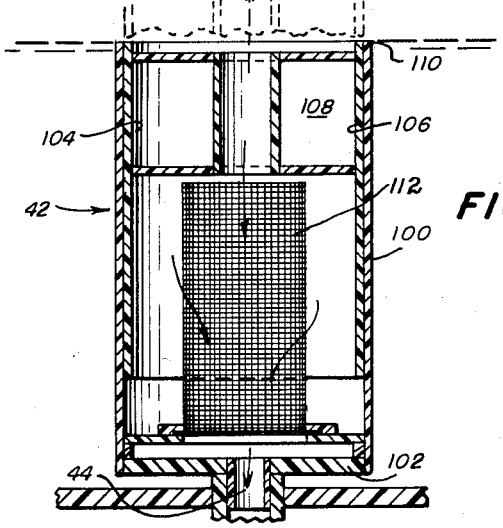
FIGURE 5 is a vertical sectional view showing the details of the constant flow return water receiver.

As illustrated in FIGURE 5 the return water receiver 42 which maintains a constant flow of return water regardless of the water level in the tank comprises a cylindrical vertical wall 100 having a bottom 102 and an open top. The bottom is apertured to receive one end of piping 44. A float unit 104 is telescopingly positioned within the cylindrical wall 100. The float unit 104 has a cylindrical wall 106 which slidably fits within wall 100 and an annular float chamber 108 positioned in the upper portion of the wall 106. The float chamber 108 is of such size that it will cause the telescoping float unit to maintain a prescribed position with respect to the water level in the tank 16 so as to provide a reasonably constant flow of water out of the tank. In other words, the float chamber maintains the upper end 110 of wall 106 as a prescribed height or position with respect to the water level in the tank. The use of the float unit 108 is shown in dotted lines in FIGURE 5. A cylindrical filter element 112 having a filter top is centrally positioned within the return water receiver immediately adjacent the outlet in the bottom 102.

In operation, the water in tank 16 flows over the upper edge 110 of the return water receiver 42, therethrough and out into piping 44 including valve 54 and filter 56 into pump 46, thence through piping 48 and valve 58 into the bottom of the filter assembly 36 where it passes upwardly through perforated disk 78 and then through the three successive filter beds, out the top of the filter assembly through piping 50 into cooling chamber 35, thence out piping 91 into junction box 90, out tube 94. The force of the water coming out tube 94 produces an aspirating action and draws air in through air tube 98 and mixes this air with the purified water issuing from tube 94. This mixture of water and air is projected out of the end of submerged tube 92 into the tank water.

The aerating action produced by the two aspirating units 42 is quite interesting as they constitute not only a means of introducing air into the tank water, but also serve to some degree to control the amount of air introduced thereinto. For example, when the operation of the apparatus is first started the tank water has a minimum of air therein and consequently the force exerted by the water issuing from the end of tank 94 is at a maximum, hence the maximum aspirating action is produced at this time. As the water becomes more aerated the density will be reduced and the aspirating action will be proportionately reduced. This all means that once the apparatus is in operation a somewhat constant condition of air-water mixture is achieved. If more lobsters are added, thus taking more air out of the water, this will be immediately adjusted by the aerating apparatus thus assuring a sufficient supply of air in the tank water regardless of the quantity being used by its occupants.

In view of the foregoing it is apparent that the water purifying and conditioning apparatus of this invention provides an efficient means of purifying, cooling and aerating water used in lobster tanks or the like.

This application is a continuation-in-part of application Serial No. 782,896, filed December 24, 1958, entitled "Lobster Tank With Artificial Ocean Water and a Filter Therefor," now U.S. Patent No. 3,025,831.

What I claim as novel and desire to secure by Letters Patent of the United States is:

In combination with a tank having water therein suitable for maintaining lobsters, or the like, in a healthy manner, a water purification and conditioning system comprising a return water receiver positioned in the tank to provide a constant flow of return water regardless of the water level in the tank, said return water receiver including a cylindrical receptacle having an apertured bottom and an open top, said apertured bottom providing the outlet, a return water filter within the cylindrical receptacle to filter the return water passing through the aforesaid outlet, an annular float having a cylindrical wall generally coextensive with the cylindrical receptacle and telescopically carried therein, said float having an upper outer peripheral edge, the float being responsive to the water level in the tank whereby a constant amount of water flows over its upper outer peripheral edge, a filter assembly for purifying the return water, conduit means connecting the outlet of the return water receiver to the filter assembly, a water cooling chamber in the bottom portion of the tank, conduit means connecting the filter assembly to the water cooling chamber, cooling coils located in said cooling chamber, means for supplying coolant to said coils, aspirating means positioned in tank to receive the purified and cooled water and introduce it in aerated condition into the tank water, said aspirating means comprising an outer tube, an inner tube of shorter length positioned centrally within the outer tube, an air supply tube connected to the outer tube at a point intermediate the length of the smaller tube, the outer tube being positioned below the water level in the tank and the free end of the air supply tube being above the water level so that when water is forced through the smaller tube air will be drawn into the stream of water as it proceeds into the tank water, and pump means in the system to provide the necessary flow force.

References Cited in the file of this patent
UNITED STATES PATENTS

| | | |
|---|---|---|
| 950,999 | Erlwein | Mar. 1, 1910 |
| 2,253,516 | Haldeman | Aug. 26, 1941 |
| 2,579,304 | Crawford | Dec. 18, 1951 |
| 2,594,474 | McGrath | Apr. 29, 1952 |
| 2,672,845 | Schneithorst | Mar. 23, 1954 |
| 2,696,800 | Rork | Dec. 14, 1954 |